United States Patent
Choi

(10) Patent No.: US 8,020,892 B2
(45) Date of Patent: Sep. 20, 2011

(54) CUSHION STRUCTURE OF SIDE AIRBAG

(75) Inventor: Jaeho Choi, Seoul (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 57 days.

(21) Appl. No.: 12/250,719

(22) Filed: Oct. 14, 2008

(65) Prior Publication Data

US 2009/0051151 A1    Feb. 26, 2009

(30) Foreign Application Priority Data

Dec. 13, 2007  (KR) .................. 10-2007-0130013

(51) Int. Cl.
*B60R 21/239* (2006.01)
(52) U.S. Cl. ............... 280/743.1; 280/729; 280/730.2; 280/743.2
(58) Field of Classification Search .......... 280/729, 280/730.1, 730.2, 731, 736, 743.1, 743.2
See application file for complete search history.

(56) References Cited

U.S. PATENT DOCUMENTS

| | | | |
|---|---|---|---|
| 5,454,595 A * | 10/1995 | Olson et al. ............. | 280/743.1 |
| 6,554,316 B2 | 4/2003 | Schneider et al. | |
| 6,722,691 B1 * | 4/2004 | Håland et al. ............. | 280/730.1 |
| 7,278,656 B1 * | 10/2007 | Kalandek ................ | 280/730.2 |
| 2005/0206147 A1 * | 9/2005 | Sievers ................... | 280/743.1 |
| 2007/0267851 A1 * | 11/2007 | Svenbrant et al. ........ | 280/729 |
| 2007/0267854 A1 * | 11/2007 | Fukuda et al. ........... | 280/730.2 |
| 2008/0252054 A1 * | 10/2008 | Kim et al. ................ | 280/743.2 |

FOREIGN PATENT DOCUMENTS

| | | |
|---|---|---|
| JP | 2004-210047 A | 7/2004 |
| JP | 2007-83835 A | 4/2007 |
| KR | 10-2005-0049772 A | 5/2005 |
| KR | 10-0564356 B1 | 3/2006 |
| KR | 10-2007-0066281 A | 6/2007 |

OTHER PUBLICATIONS

Yuji Sato, Side Airbag Device, JPO, JP 2007-83835 A, Sep. 21, 2005, English Abstract.*
Yuji Sato, Side Airbag Device, JPO, JP 2007-83835 A, Sep. 21, 2005, Machine Translation of Description.*

* cited by examiner

*Primary Examiner* — Eric Culbreth
*Assistant Examiner* — James English
(74) *Attorney, Agent, or Firm* — Morgan, Lewis & Bockius LLP

(57) ABSTRACT

The invention provides a cushion structure of a side airbag that includes: an inflator generating inflation gas in response to an inflation signal that is inputted in a collision; and a cushion inflated by the inflation gas supplied from the inflator. The cushion is divided into an upper cushion and a lower cushion by an intermediate diaphragm. The upper cushion and the lower cushion are fluidly communicated with each other through the intermediate diaphragm having at least a communication hole, and receive the inflation gas from the inflator. The upper cushion inflates in larger width than the lower cushion.

6 Claims, 5 Drawing Sheets

US 8,020,892 B2

CUSHION STRUCTURE OF SIDE AIRBAG

CROSS-REFERENCE TO RELATED APPLICATIONS

The present application is based on, and claims priority from, Korean Application Serial Number 10-2007-0130013, filed on Dec. 13, 2007, the disclosure of which is hereby incorporated by reference herein in its entirety.

FIELD OF THE INVENTION

The present invention relates to a cushion structure of a side airbag, particularly a cushion structure of a side airbag that can reduce damage to a passenger by making the volume of an upper cushion larger than that of a lower cushion inside a cushion that inflates in a collision.

BACKGROUND OF THE INVENTION

In general, a side airbag is mounted inside a vehicle to secure protection for the passenger's chest and pelvis in a collision.

For the protection, the side airbag includes an inflator that generates high-pressure inflation gas by burning a gas generating agent in response to an inflation signal inputted in a collision and a cushion that is inflated toward the side of a passenger by the inflation gas supplied from the inflator.

The above cushion is formed by sewing the edges of two fabrics such that sealed spaces are formed inside the fabrics and the upper and lower portions of the cushion have the same volume when inflation is finished, such that the upper portion of the cushion contacts the passenger's chest and the lower portion contacts the passenger's pelvis.

However, the chest of a human body is composed of the ribs that are structurally weak relative to the pelvis, such that when a side airbag with a cushion having the same shock-absorbing performance is used, the damage to a passenger caused by a collision is relatively larger at the chest than the pelvis.

Therefore, proper measures should be variously devised for the side airbag in design to minimize damage to the passenger's chest.

SUMMARY OF THE INVENTION

Embodiments of the present invention provide a cushion structure of an airbag that achieves an optimal shock-absorbing effect for the passenger's body when a cushion inflates, by making the volumes of the upper and lower cushions inside the cushion of the side airbag different and appropriately distributing inflation pressure throughout the inside of the cushion.

According to an embodiment of the invention, a cushion structure of a side airbag includes an inflator and a cushion. The inflator generates inflation gas in response to an inflation signal that is inputted in a collision and the cushion is inflated by the inflation gas supplied from the inflator. The cushion is divided into an upper cushion and a lower cushion by an intermediate diaphragm. The upper cushion and the lower cushion are fluidly communicated with each other through the intermediate diaphragm having at least a communication hole, and receive the inflation gas from the inflator. The upper cushion inflates in larger width than the lower cushion.

According to a cushion structure of a side airbag of the invention, it is possible to minimize damage to a passenger while appropriately distributing inflation pressure throughout the inside of the cushion of the airbag in a collision by dividing the cushion into an upper cushion having a large volume and a lower cushion having a smaller volume than the upper cushion and communicated with the upper cushion.

BRIEF DESCRIPTION OF THE DRAWINGS

For better understanding of the nature and objects of the present invention, reference should be made to the following detailed description with the accompanying drawings, in which.

Figure 1:
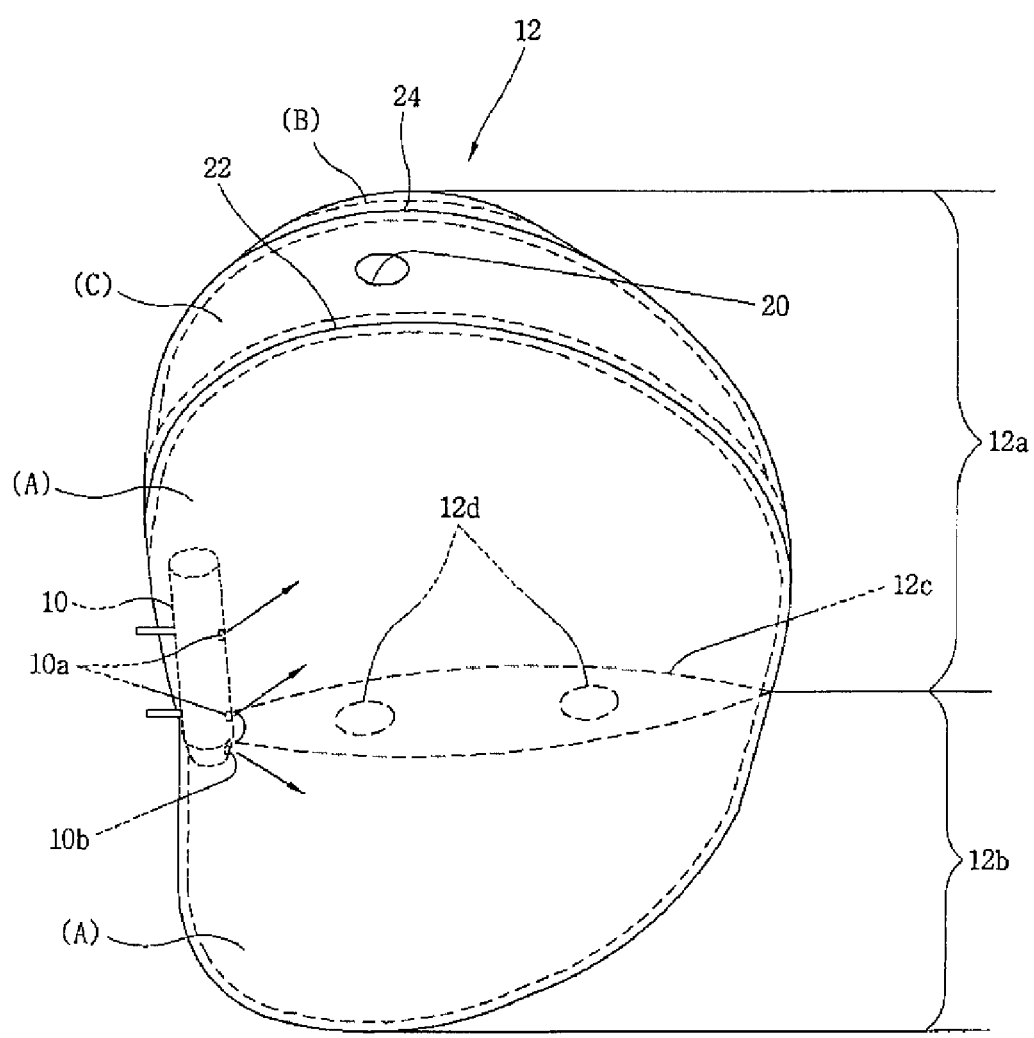
FIG. 1 is a perspective view showing a cushion structure of a side airbag according to an embodiment of the invention.
Figure 2:
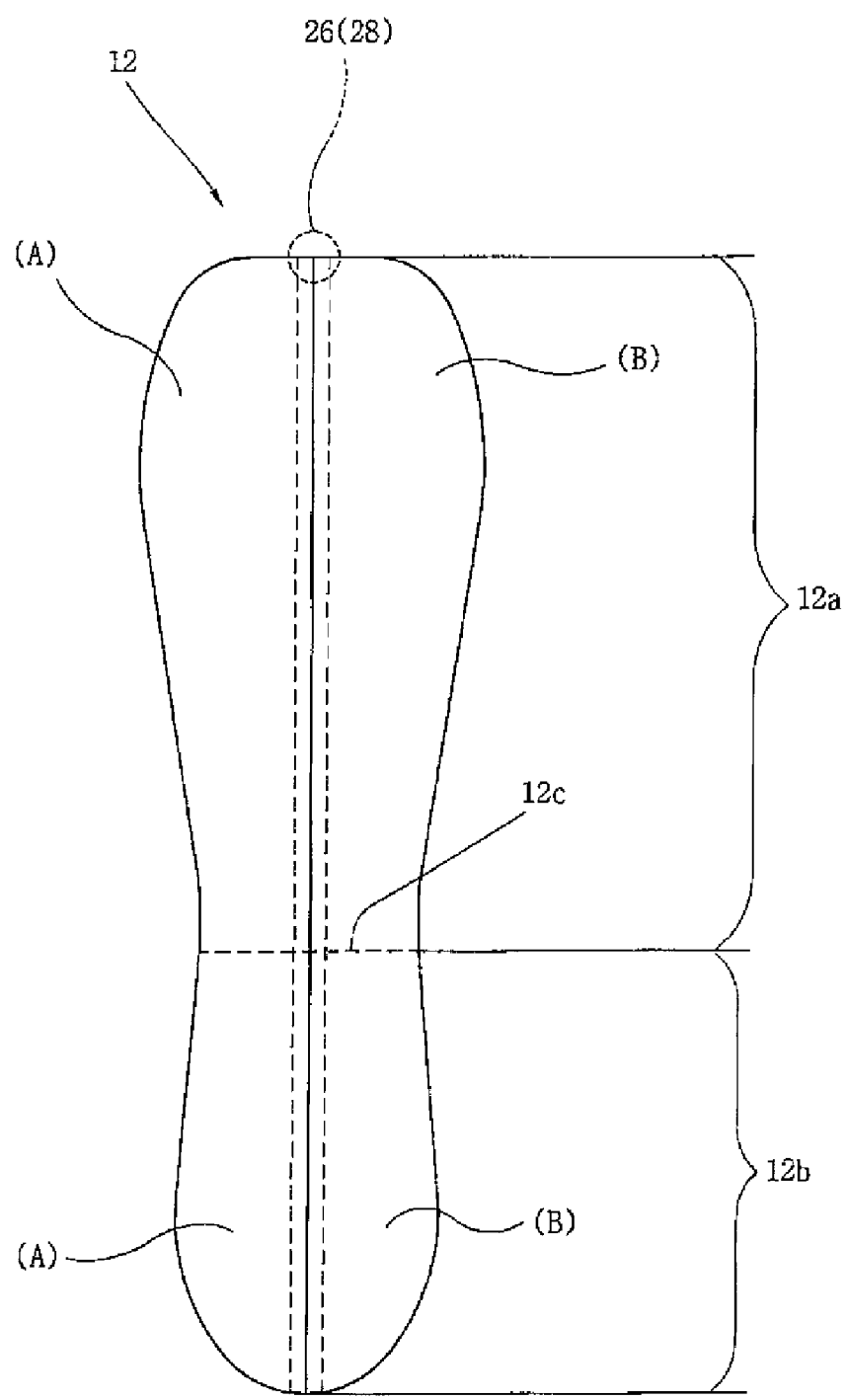
FIG. 2 is a side view of the cushion shown in FIG. 1.

In the figures, reference numbers refer to the same or equivalent parts of the present invention throughout the several figures of the drawing.

DETAILED DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

As shown in the figures, a cushion structure of a side airbag includes an inflator 10 that generates high-pressure inflation gas by burning a gas generating agent in response to an inflation signal inputted in a collision and a cushion 12 that is inflated by the inflation gas supplied from inflator 10.

Cushion 12 has an upper cushion 12a that is inflated by the inflation gas supplied from inflator 10 to protect the passenger's chest, a lower cushion 12b that is inflated by the inflation gas supplied from inflation 10 to protect the passenger's pelvis, and an intermediate diaphragm 12c that divides the cushion 12 as upper cushion 12a and lower cushion 12b and has at least a communicating hole 12d that fluidly communicates the upper cushion 12a with the lower cushion 12b. Therefore, it is possible to appropriately distribute the inflation pressure inside the cushion 12 by allowing the inflation gas to flow into the upper cushion 12a and the lower cushion 12b through the at least a communication hole 12d formed through intermediate diaphragm 12c.

In an exemplary embodiment of the present invention, the upper cushion 12a is formed to have a height larger than the lower cushion 12b.

The lower cushion 12b is formed by sewing lower portions of two main fabrics A, B. The upper cushion 12a is formed by sewing one sub-fabric C between two main fabrics A, B upwards from distal ends of the intermediate diaphragm 12c. Further, the farther away the height of the upper cushion 12a is from the intermediate diaphragm 12c, the more the sub-fabric C disposed between upper portions of the main fabrics A, B gradually increases in width, and at least a vent hole 20 open to the outside is formed at the upper portion of sub-fabric C. In an embodiment of the present invention, the vent hole 20 is formed at a center of the upper portion of sub-fabric C.

To be more detailed, the upper cushion 12a is formed of upper connecting portions 22 and 24. The upper connecting portion 22 is made by connecting one edge of upper portion of the main fabric A with one edge of upper portion of the sub-fabric C. The upper connecting portion 24 is made by connecting the other edge of the upper portion of the sub-fabric C with one edge of upper portion of the main fabric B. The lower cushion 12b is formed by connecting edge of lower portion of the main fabric A with edge of lower portion of the main fabric B.

Further, temporary connecting portions 26, 28 are configured to couple the upper connecting portions 22 and 24 as explained hereinafter.

Figure 3:
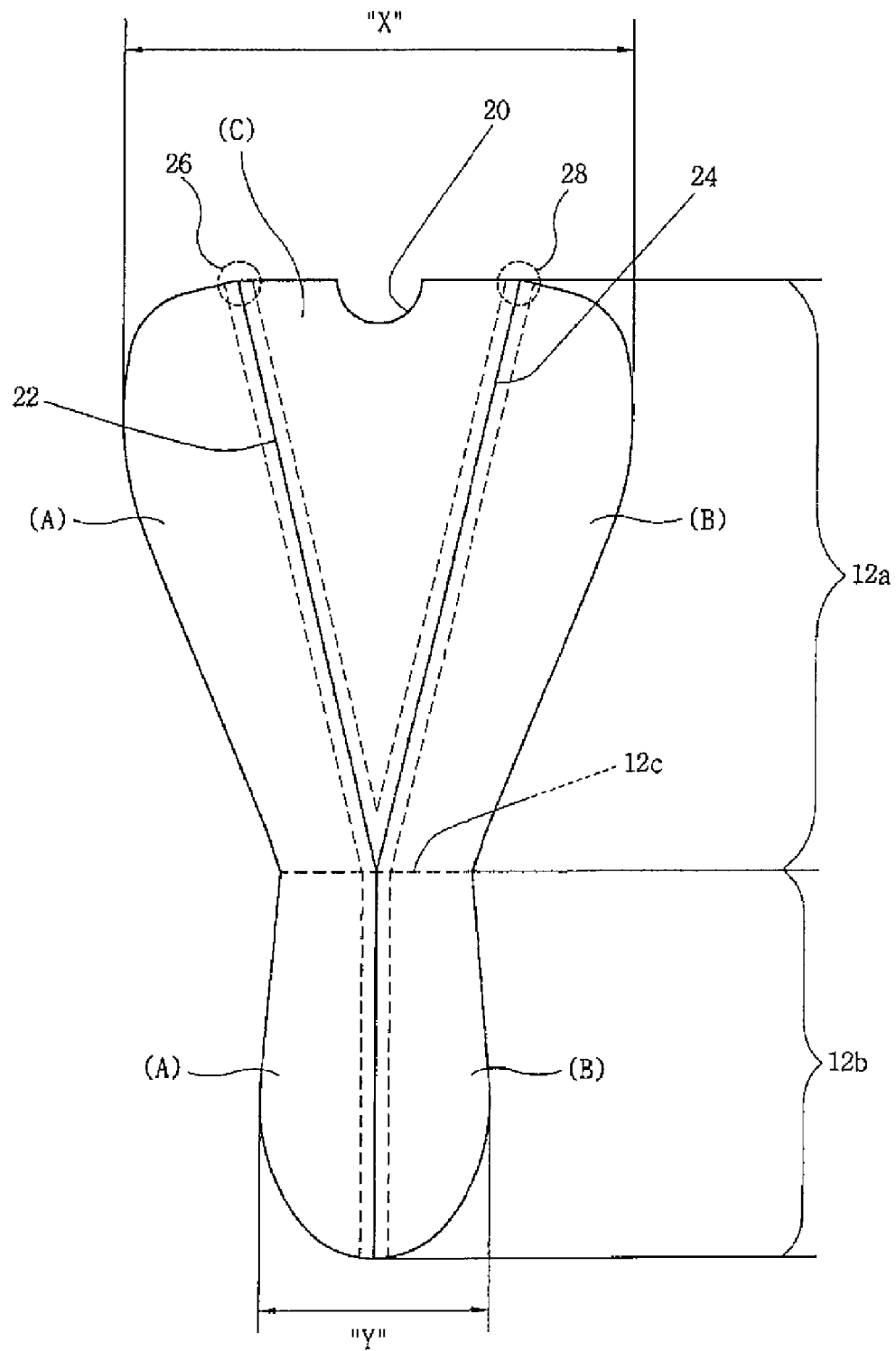
FIG. 3 is a side view showing the cushion shown in FIG. 2, which has inflated.
Figure 4:
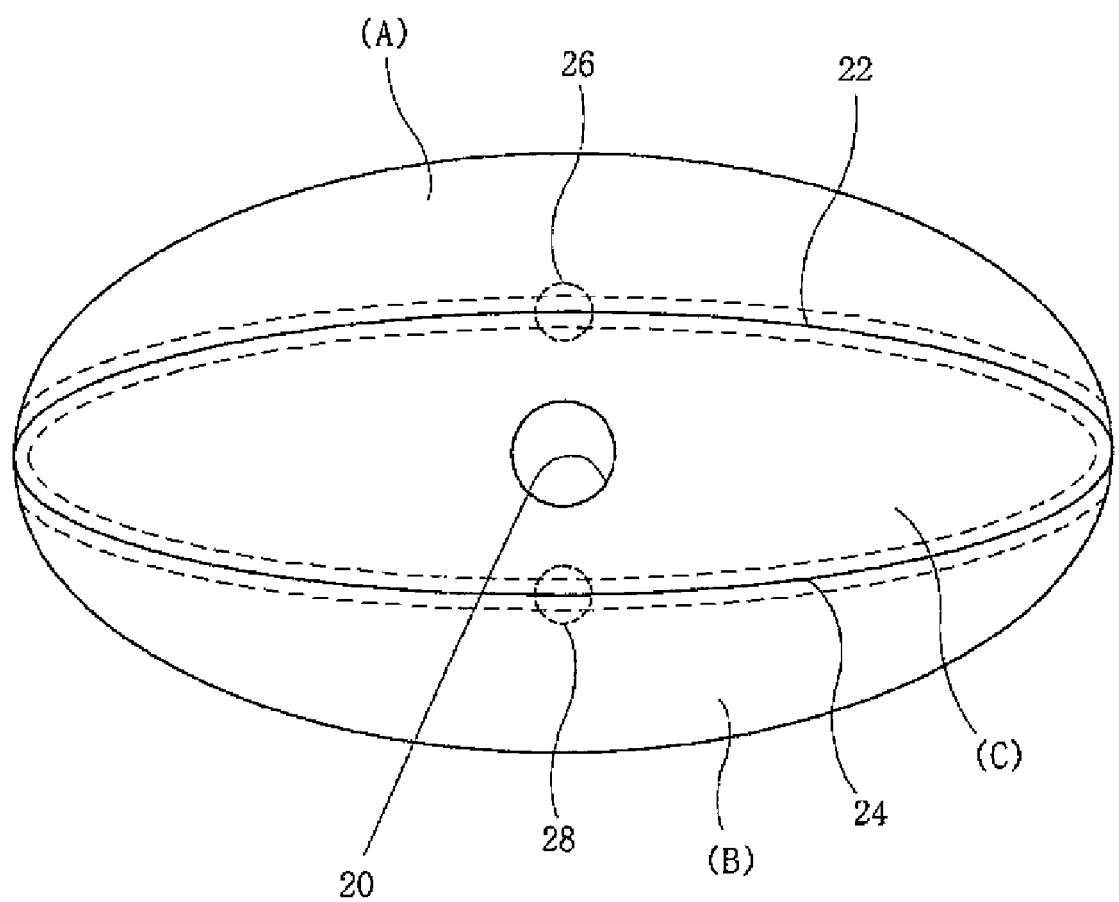
FIG. 4 is a plan view of FIG. 3.
Figure 5:
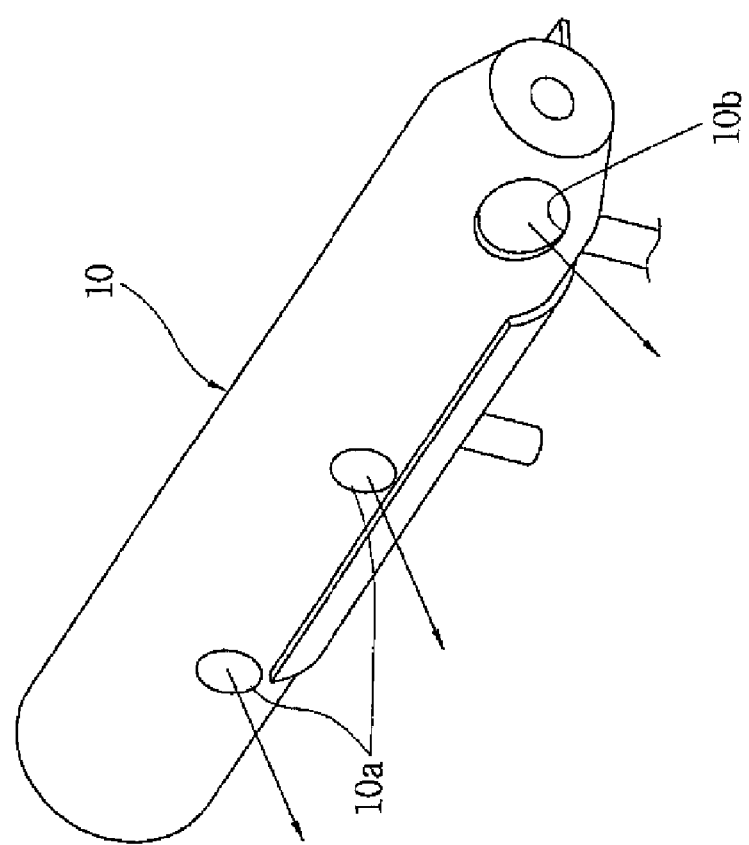
FIG. 5 is a perspective view of the inflator shown in FIG. 2.

Referring to FIG. 3, in an exemplary embodiment of the present invention, the temporary connecting portions 26 and 28 are positioned on the upper connecting portions 22 and 24 and connected in a normal condition but separated in inflation of cushion 12. The temporary connecting portions 26 and 28 are to be coupled. For example, the temporary connecting portions 26 and 28 can be sewed such that the upper connecting portions 22 and 24 can be separated when upper cushion 12a is inflated by the inflation gas supplied from inflator 10. In an exemplary embodiment of the present invention, the vent hole 20 formed at upper portion of the sub-fabric B is aligned in series with the temporary connecting portions 26, 28 in vertical direction with respect to the longitudinal direction of the sub-fabric C. Accordingly, the temporary connecting portions 26, 28 may be separated easily by the expanding force of the upper cushion 12a inflated by the inflation gas supplied from inflator 10.

Due to this configuration set forth above, the upper connecting portions 22 and 24 facilitate folding the upper cushion 12a of cushion 12 into a small volume to put the side airbag into the side of a seat. Further, temporary connecting portions 26, 28 temporarily prevents the inflation gas from being discharged through the vent hole 20 at the earlier inflation stage of cushion 12, while they allow the inflation gas to be discharged through the vent hole 20 when the upper cushion 12a has completely inflated, pressing the passenger's chest, thereby absorbing the impact.

The inflator 10 has at least injection hole 10a to supply the inflation gas into the upper cushion 12a and an injection hole 10b to supply the inflation gas into the lower cushion 12b. Since the volume of the upper cushion 12a is larger than that of the lower cushion 12b, more injection holes are provided to the upper cushion 12a than the lower cushion 12b in an exemplary embodiment of the present invention. Therefore, as the inflator 10 supplies the high-pressure inflation gas into the cushion 12 through injection holes 10a and 10b in response to an inflation signal inputted in a side collision, the upper cushion 12a and the lower cushion 12b inflate to protect the passenger's chest and pelvis, respectively.

Referring to FIG. 3, an upper length X of upper cushion 12a in the width direction thereof is increased by the sub-fabric C disposed between main fabrics A, B of the upper cushion 12a as the cushion 12 is inflated. That is, when the cushion 12 inflates, the lower cushion 12b increases as length Y in the width direction thereof but the upper length X of the upper cushion 12a in the width direction thereof increases as much as summation of the width of sub-fabric C and the increased length Y of the lower cushion 12b.

As a result, the volume of upper cushion 12a is larger than that of lower cushion 12b, such that it is possible to increase the shock-absorbing effect against the impact that is applied to the chest, i.e., the upper portion of the passenger's upper body when the cushion 12 inflates in a side collision. The shock-absorbing effect that is obtained by discharging the inflation gas through the vent hole 20 from the upper portion of sub-fabric C also contributes to the above shock absorbing effect, in addition to setting length X in the width direction of upper cushion 12a relatively large.

Further, the volume of lower cushion 12b is involved in absorbing the impact applied to the pelvis at the lower portion of the passenger's upper body.

That is, in cushion 12 of the side airbag that inflates in a side collision, since upper length X in the width direction of upper cushion 12a is larger than length Y in the width direction of lower cushion 12b, it is possible to minimize damage to the ribs of the chest having smaller strength than the pelvis in the passenger's body, thereby reducing injuries.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A cushion structure of a side airbag comprising:
   an inflator generating inflation gas in response to an inflation signal that is inputted in a collision; and
   a cushion configured to be inflated by the inflation gas supplied from the inflator,
   wherein the cushion receiving the inflation gas from the inflator is divided into an upper cushion and a lower cushion by an intermediate diaphragm disposed in the cushion, the upper cushion and the lower cushion being fluidly communicated with each other through at least a communication hole formed on the intermediate diaphragm, and upper width of the upper cushion is larger than width of the lower cushion when the cushion is inflated;
   wherein the lower cushion is formed by connecting lower portions of first and second main fabrics, and the upper cushion is formed by connecting a sub-fabric in between upper portions of the first and second main fabrics upwards from distal end portions of the intermediate diaphragm;
   wherein the sub-fabric has at least a vent hole that is open to the outside of the cushion structure;
   wherein the upper cushion is formed of first and second upper connecting portions,
   wherein the first upper connecting portion is made by connecting one edge of upper portion of the first main fabric with one edge of upper portion of the sub-fabric and the second upper connecting portion is made by connecting the other edge of the upper portion of the sub-fabric with one edge of upper portion of the second main fabric, and wherein the lower cushion is formed by connecting edge of lower portion of the first main fabric with edge of lower portion of the second main fabric;
   wherein at least two temporary connecting portions that are connected in a normal condition and separated in inflation of the cushion are formed at the first and second upper connecting portions respectively;

wherein the vent hole is enclosed by the upper cushion under the at least two temporary connecting portions in the normal condition; and wherein the farther away the height of the upper cushion is from the intermediate diaphragm, the more the sub-fabric disposed between upper portions of the main fabrics gradually increases in width.

2. The cushion structure as defined in claim 1, wherein the height of the upper cushion is larger than the height of the lower cushion.

3. The cushion structure as defined in claim 1, wherein two of the at least two temporary connecting portions and the vent hole are formed in series substantially in vertical direction with respect to the longitudinal direction of the sub-fabric.

4. The cushion structure as defined in claim 3, wherein the vent hole is formed substantially in a center of the upper portion of the sub-fabric.

5. The cushion structure as defined in claim 1, wherein the inflator supplies to the upper cushion and the lower cushion.

6. The cushion structure as defined in claim 5, wherein the inflator supplies to the upper cushion through at least an injection hole and the lower cushion through at least an injection hole.

* * * * *